United States Patent
Hull, Jr.

[15] 3,693,354
[45] Sept. 26, 1972

[54] AIRCRAFT ENGINE FAN DUCT BURNER SYSTEM

[72] Inventor: Thomas Neil Hull, Jr., Marblehead, Mass.

[73] Assignee: General Electric Company

[22] Filed: Jan. 22, 1971

[21] Appl. No.: 108,867

[52] U.S. Cl. ................ 60/261, 60/39.72 R, 60/262
[51] Int. Cl. ........................ F02k 3/04, F02k 3/10
[58] Field of Search ........ 60/224, 225, 226, 261, 262, 60/244, 245, 39.72 R

[56] References Cited

UNITED STATES PATENTS

| | | | |
|---|---|---|---|
| 3,295,325 | 1/1967 | Nelson | 60/261 |
| 3,338,051 | 8/1967 | Chamberlain | 60/226 R |
| 3,340,689 | 9/1967 | Kueng | 60/226 R |
| 3,368,352 | 2/1968 | Hewson | 60/224 |
| 3,479,823 | 11/1969 | Parnell | 60/224 |

FOREIGN PATENTS OR APPLICATIONS

| | | | |
|---|---|---|---|
| 768,035 | 5/1955 | Germany | 60/224 |
| 774,051 | 5/1957 | Great Britain | 60/224 |
| 977,495 | 11/1950 | France | 60/224 |
| 1,084,980 | 7/1960 | Germany | 60/224 |

Primary Examiner—Douglas Hart
Attorney—Edward S. Roman, Derek P. Lawrence, Frank L. Neuhauser, Oscar B. Waddell and Joseph B. Forman

[57] ABSTRACT

A bypass gas turbine engine is provided with an augmentation burner in the bypass airpassage for additional thrust, wherein combustion in the augmentation burner is supported and enhanced by the exhaust from an auxiliary combustor stationed forward of the augmentation burner.

6 Claims, 4 Drawing Figures

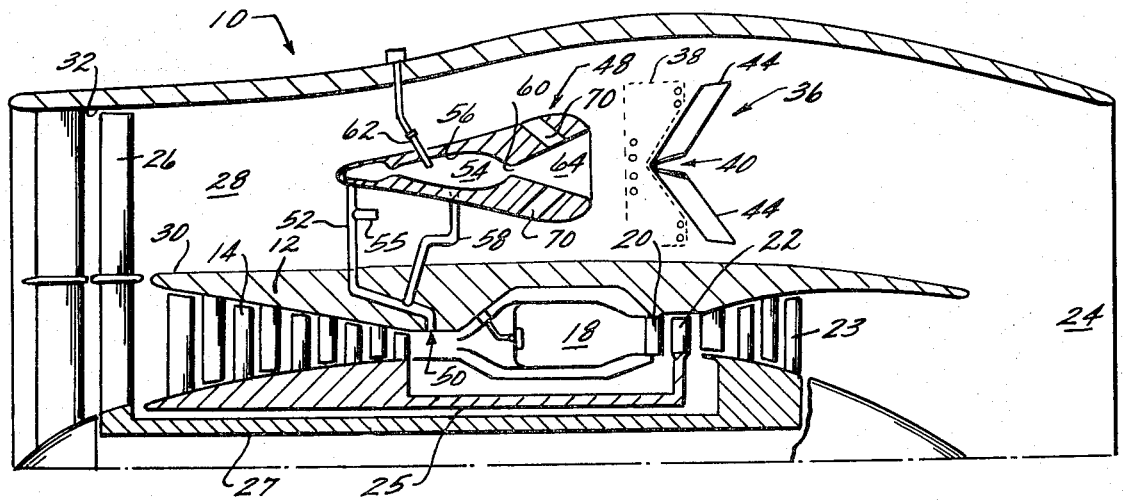
Fig 1
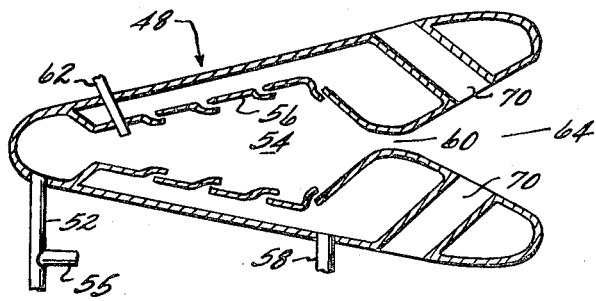
Fig 2
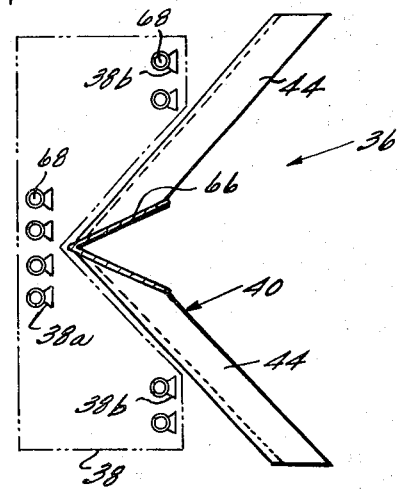
INVENTOR.
THOMAS N. HULL, JR.
Edward Roman
ATTORNEY

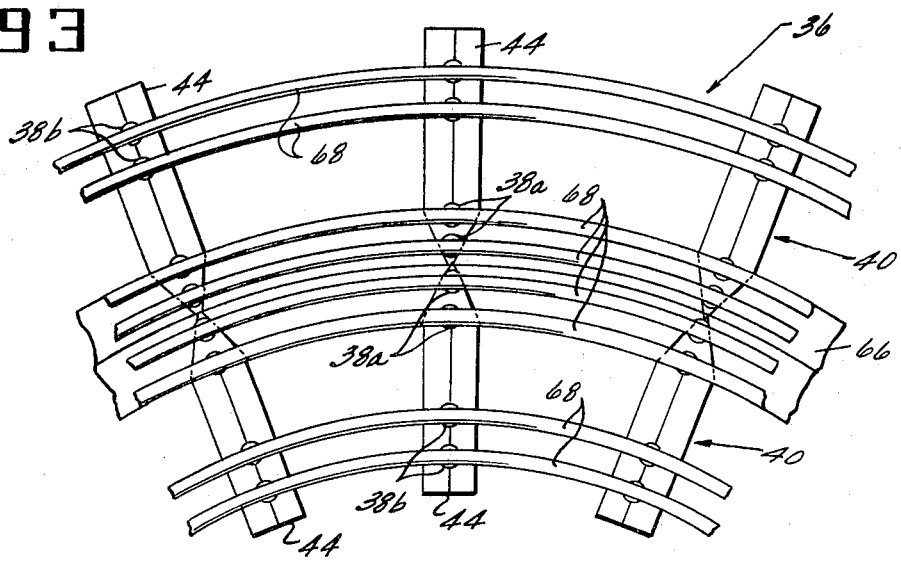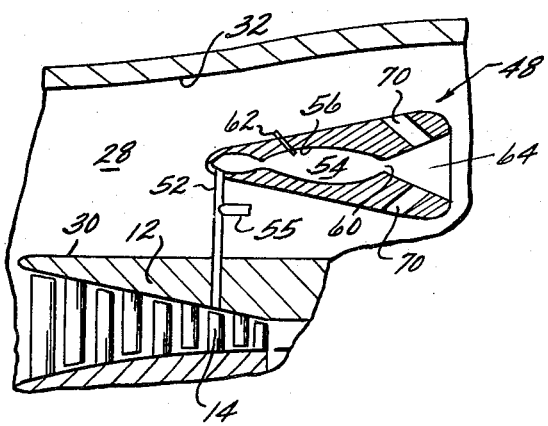

AIRCRAFT ENGINE FAN DUCT BURNER SYSTEM

BACKGROUND OF THE INVENTION

This invention relates to a bypass gas turbine engine, and more particularly to a bypass gas turbine engine including an augmentation burner within the bypass airpassage for increasing engine thrust, wherein the augmentation burner has improved combustion efficiency provided by an auxiliary combustor.

In a bypass gas turbine engine, a portion of the air entering the engine is bypassed around the compressor, the combustion stage and the turbine of the gas turbine engine. The bypassed air may be ram induction air, in which case there would be no additional thrust added to the thrust produced within the combustion stage portion of the engine. The bypass gas turbine engine may alternatively include a fan section wherein a portion of the air flow through the fan is directed to the bypass airpasssage. Such engines are well known to the art and commonly referred to as turbofan engines. The invention shall hereinafter be described in relation to a bypass gas turbine engine of the turbofan type, although it is understood that the broad scope of the invention is applicable to all bypass gas turbine engines.

Recently it has been suggested that bypass augmentation burners be included in the bypass airpassages of turbofan engines in order to provide additional thrust to the thrust produced within the combustion stage portion of the engine. The inlet conditions for such bypass augmentation burners usually include the relatively low temperature and low pressure fan air which makes ignition difficult, and with liquid atomized fuel makes for a relatively long burning length.

Also, the low temperature and pressure fan air, particularly at high altitudes tends to fall below the critical values required to sustain combustion in the augmentation burners, thereby causing the burner flame to blow out.

Therefore, it is an object of this invention to provide an augmentation burner in the bypass airpassage of a turbofan engine wherein combustion efficiency will be improved.

It is also an object of this invention to provide an augmentation burner in the bypass airpassage of a turbofan engine wherein the flame burning length is reduced.

It is a further object of this invention to provide an augmentation burner in the bypass airpassage of a turbofan engine wherein the probability of a flame blowout is substantially reduced at high altitudes, and burner ignition can be obtained over a wide range of flight conditions.

BRIEF DESCRIPTION OF THE INVENTION

This invention relates to a bypass gas turbine engine of the turbofan type comprising in flow series: a compressor section; a combustor means; a turbine means drivably connected to the compressor section; a casing circumferentially enclosing the compressor section, combustor means, and turbine means; a bypass outer wall circumferentially enclosing the casing and spaced apart therefrom, so as to define an annular bypass passageway therebetween; at least one augmentation burner within the bypass passageway; at least one auxiliary combustor forward of the augmentation burner and in substantial coaxial alignment with the augmentation burner, such that the hot exhaust from the auxiliary combustor is directed into the augmentation burner and improves the combustion efficiency thereof; fuel injection means for injecting fuel into the augmentation burner and the auxiliary combustor; and a conduit means to convey a portion of the air compressed by the compressor to the auxiliary combustor so as to support combustion therein.

The turbofan engine of this invention includes a fan section forward of the compressor section and drivably connected to the turbine means so that a portion of the airflow through the fan is directed to the bypass airpassage.

The auxiliary combustor may include an annular combustion chamber, and the conduit means may include a plurality of radial conduits for ducting, either compressor interstage air or compressor discharge air, to a plurality of circumferentially spaced apart openings along the forward edge of the combustion chamber. The augmentation burner includes a circumferential defector in the bypass airpassage and a plurality of circumferentially spaced apart radial gutters extending from the deflector. A plurality of fuel nozzles are stationed in the bypass airpassage upstream of the flameholder, such that fuel may be injected into the flowstream for impingement upon the flameholder. Also, a plurality of circumferential tubes supply fuel to the nozzles and receive heat from the auxiliary combustor so that the fuel will evaporate upon ejection from the nozzles.

BRIEF DESCRIPTION OF THE DRAWINGS

FIG. 1 shows a cross-sectional view of the turbofan engine of this invention.

FIG. 2 shows a detailed cross-sectional view of the augmentation burner and auxiliary combustor and their relative positions to each other in the bypass passageway of the engine of FIG. 1.

FIG. 3 show a cross-section of the circumferential flameholder including the fuel nozzles and the circumferential tubes servicing them as taken on line 3—3 of FIG. 2.

FIG. 4 shows an alternate embodiment for the engine of FIG. 1.

DESCRIPTION OF THE PREFERRED EMBODIMENT

Referring to the FIG. 1, a bypass gas turbine engine 10 of the turbofan type is illustrated as comprising a casing 12 which encloses in flow series: a compressor section 14, a main combustor 18, duct means 20 extending from the combustor, a high pressure turbine section 22, a low pressure turbine section 23, and an exhaust nozzle means 24. This engine can be a conventional turbofan engine as is well known in the art. Compressor section 14 is drivably connected to high pressure turbine 22 through shaft 25. A forward fan section 26 is drivably connected to the low pressure turbine 23 through shaft 27.

An annular bypass airpassage 28 is formed between an inner wall 30 extending from the forward end to the aft end of casing 12 and an outer wall 32, extending therearound and radially spaced apart therefrom. The outer wall 32 extends at its forward end so as to enclose a fan 26. The exhaust nozzle 24 is defined by the aft end of the outer wall 32 and may be any conventional nozzle known to the art.

The fan section 26 receives air through the forward inlet at the forward end of the outer wall 32. The fan 26 delivers a portion of its air to the axial flow compressor section 14. The compressor section 14 supplies its air to a combustion chamber 18 where heat is added to the air by burning fuel therein. From the combustion chamber, the hot gases coact with the blades of the turbines 22, 23 for driving the turbines. The hot gases discharge through the nozzle 24 formed by the rearward portion of the casing whereby the engine 10 is provided with forward propulsive thrust.

Bypass augmentation burners 36 are circumferentially spaced apart within bypass airpassage 28. Fuel is introduced into each bypass augmentation burner by a plurality of circumferentially spaced apart fuel injection nozzles which are shown enclosed within phantom lines 38 in FIGS. 1 and 2. The fuel is supplied from the fuel nozzles stationed upstream of the flameholder 40, which is mounted in the bypass airpassage 28 to ignite the fuel and air mixture flowing therethrough. Each flameholder 40 includes a plurality of radial gutters 44 which are circumferentially spaced apart as shown in FIG. 3 and sloped aft as shown in FIGS. 1 and 2. The flameholder 40 further includes a deflector 66 which is in close proximity to the multiple circumferentially spaced apart fuel nozzles 38a. The remaining multiple circumferentially spaced apart fuel nozzles 38b are stationed in close proximity to the radial gutters 44.

A substantial improvement in augmentation burner efficiency is effected by the introduction of auxiliary combustor 48 into the bypass airpassage 28. The auxiliary combustor of this invention is described in reference to an annular configuration, although the well known cannular configuration would be equally applicable. The auxiliary combustor 48 utilizes the high temperature and high pressure air from the basic engine in order to better sustain combustion at low fan air temperatures and pressures. The high temperature and high pressure air preferably is compressor discharge air which flows from the compressor section 14 through conduit means 50, into the forward end of the auxiliary combustor 48.

Conduit means 50 include a plurality of radial conduits 52 which duct and discharge high temperature and high pressure air to a plurality of circumferentially spaced apart openings along the forward edge of a combustion chamber 54 of the auxiliary combustor 48. The openings in the combustion chamber 54, through which compressor air is discharged, are in substantial coaxial alignment with the fuel nozzles 38 and the radial gutters 44 of the flameholder 40.

The auxiliary combustion chamber 54 includes a liner 56, through which cooling air is flowed. The auxiliary combustor cooling air is supplied by a separate conduit 58. High pressures are maintained in the auxiliary combustor by the restricted discharge area 60.

Fuel for the auxiliary combustor 48 is introduced to the high temperature and high pressure air through input port 55, which is in direct flow connection to a source of pressurized fuel (not shown), so as to mix with the air before it enters the combustor, thereby eliminating small fuel nozzles in the auxiliary combustion chamber 54. Igniters 62 may be provided within the auxiliary combustion chamber for ignition of the fuel and high temperature, high pressure air mixture when required.

The auxiliary combustor 48 ignites the fuel injected into the bypass augmentation burner 36 and improves the combustion efficiency of the augmentation burner. The hot gases of the auxiliary combustor 48 are introduced to the bypass augmentation burner 36 through an annular ejector pump 64, such that the ejector pump hot air discharge is deflected radially inward and outward by the flameholder 40 which acts as a target. A portion of the discharged hot gas flows inward and outward along the circumferentially spaced apart radial gutters 44. Fuel is injected close to the flameholder 40 through the multiple circumferentially spaced apart fuel nozzles 38a near the deflector 66, to which the radial gutters 44 are attached. The hot gas and fuel ignites and flows inward and outward along the gutters, igniting the fuel introduced at the multiple circumferentially spaced apart fuel injector nozzles 38b.

The auxiliary combustor may also be used to heat the bypass augmentation burner fuel to a vapor upon discharge through the fuel injection nozzles 38, improving combustion efficiency with a corresponding enlargement of the critical bypass temperature and pressure ranges previously required to sustain combustion and prevent flame blowout. Thus, with high pressure and temperature air supplied to the auxiliary combustor, ignition of the bypass augmentation burner can be obtained over a wide range of flight conditions. The bypass augmentation burner fuel is circulated within circumferential tubes 68 in the burner discharge area as shown in FIG. 3, absorbing heat to the vaporizing temperature before discharging through the multiple of circumferentially located fuel injection nozzles 38. When the bypass augmentation burner is not in operation, the fuel lines should be continually purged with low temperature and low pressure air to prevent coking.

Additional dilution air may be supplied to the auxiliary combustor discharge area through passageways 70 which slope inwardly and rearwardly, so as to introduce a portion of the bypass air into the hot gases exhausting from the auxiliary combustor.

The sequence for activating the bypass augmentation burner would be as follows. When the engine is operating without the bypass augmentation burner, purge air must be continually flowed through the fuel lines in order to prevent coking. High pressure compressor air may also be continuously supplied to the auxiliary combustor 48. If additional engine thrust should be required as for takeoff, fuel would be introduced into the conduit 52 to mix with the compressor air from inlet 50 flowing into the auxiliary combustor 48 and ignition would be applied to the auxiliary combustor through igniter 62. Subsequently, the augmentation burner fuel circuit would be turned on, heated to a sufficient temperature to cause vaporization upon fuel injection and ignited by the auxiliary combustor at the flameholders. Additional fuel circuits may be turned on for additional augmentation.

The reverse procedure would be followed for shutdown, first the fuel to the augmentation burner is turned off allowing purge air to flow through the fuel tubes whereupon the fuel to the auxiliary combustor is turned off.

FIG. 4 shows an alternate embodiment of the turbofan engine of FIG. 1 where compressor interstage air is ducted to the auxiliary combustor 48 through conduit means 52 instead of compressor discharge air as previously shown. Also the invention is not limited to the specific embodiment herein illustrated and described, but may include other arrangements without departure from its spirit as defined by the following claims.

What is claimed is:

1. A turbofan engine comprising in flow series:
   a fan section;
   a compressor section;
   a combustor means;
   a turbine means drivably connected to the compressor and fan sections;
   a casing circumferentially enclosing the compressor section, combustor means; and turbine means;
   a bypass outer wall circumferentially enclosing the casting and fan section, and spaced apart therefrom, so as to define an annular bypass passageway therebetween;
   at least one augmentation burner within the bypass passageway;
   at least one auxiliary combustor in the bypass passageway forward of the augmentation burner, and in substantial coaxial alignment with the augmentation burner, such that the hot exhaust from the auxiliary combustor is directed into the augmentation burner and improves the combustion efficiency thereof;
   fuel injection means for injecting fuel into the augmentation burner and the auxiliary combustor; and
   a conduit means to convey a portion of the air compressed by the compressor section to the auxiliary combustor so as to support combustion therein.

2. The bypass gas turbine of claim 1 wherein the auxiliary combustor includes: an annular combustion chamber, and the conduit means include a plurality of radial conduits connected to duct air compressed by the compressor section to a plurality of circumferentially spaced apart openings along the forward edge of the annular combustion chamber.

3. The bypass gas turbine of claim 2 wherein the radial conduits are connected to duct compressor discharge air.

4. The bypass gas turbine of claim 2 wherein the radial conduits are connected to duct compressor interstage air.

5. The bypass gas turbine of claim 2 wherein the auxiliary combustor includes a combustion liner and a second conduit means for ducting compressor air to the combustion liner for cooling thereof.

6. The bypass gas turbine of claim 1 wherein the augmentation burner comprises:
   a flameholder including a circumferential deflector in the bypass airpassage and a plurality of circumferentially spaced apart radial gutters extending from the deflector; a plurality of fuel nozzles stationed forward of the flameholder, whereby fuel may be injected into the flowstream for impingement upon the flameholder; and a plurality of circumferential tubes supplying fuel to the nozzles and in heat receiving relation to the exhaust of the auxiliary combustor, such that fuel is heated within the tubes to substantially evaporate upon ejection from the nozzles.

* * * * *